J. M. CARRÈRE.
METHOD OF MAKING PORTLAND CEMENT.
APPLICATION FILED NOV. 24, 1908.
978,848.
Patented Dec. 20, 1910.
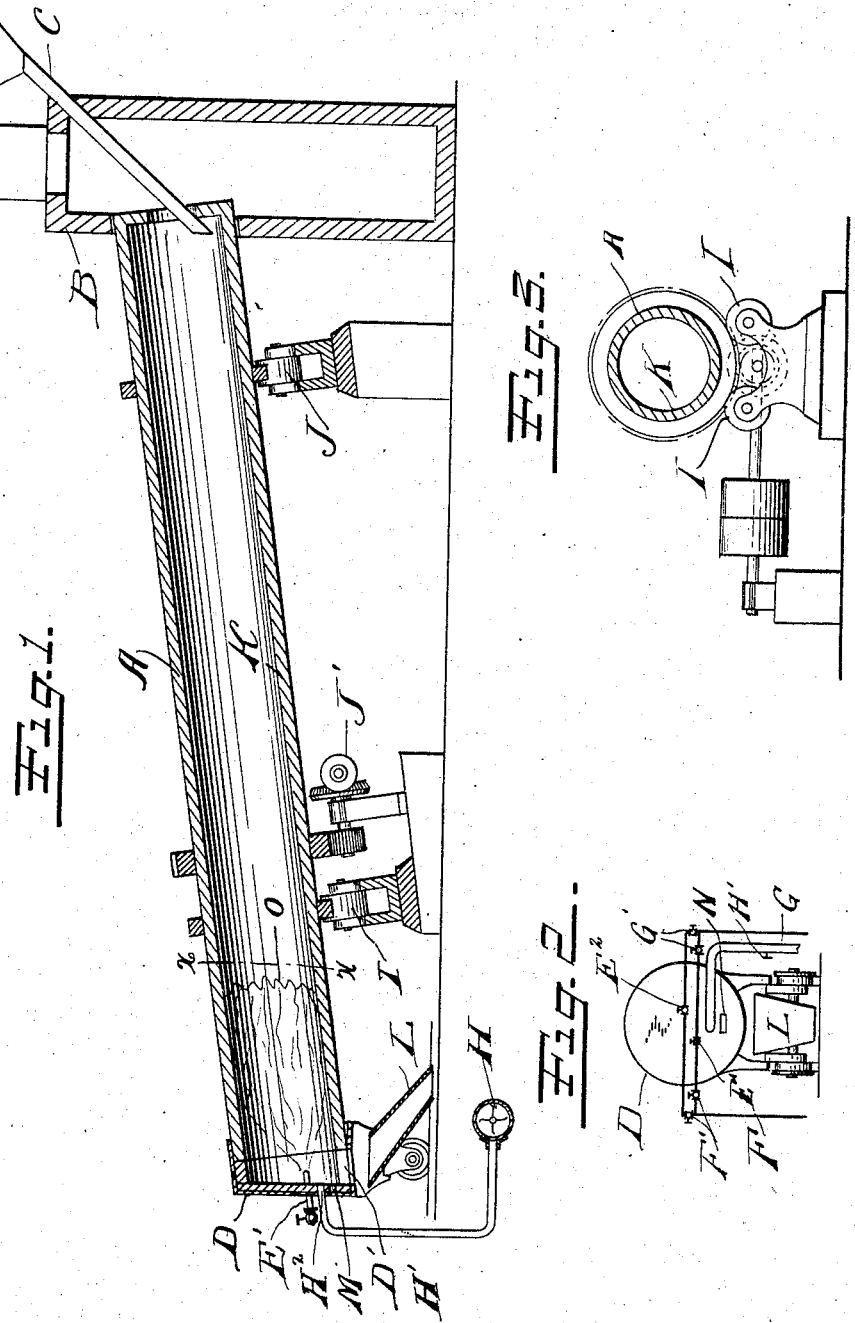
Witnesses:
Inventor
J. M. Carrère
By his Attorneys

UNITED STATES PATENT OFFICE.

JOSEPH MAXWELL CARRÈRE, OF ALLENTOWN, PENNSYLVANIA, ASSIGNOR TO BLANC STAINLESS CEMENT COMPANY, OF ALLENTOWN, PENNSYLVANIA, A CORPORATION OF NEW JERSEY.

METHOD OF MAKING PORTLAND CEMENT.

978,848. Specification of Letters Patent. Patented Dec. 20, 1910.

Application filed November 24, 1908. Serial No. 464,243.

*To all whom it may concern:*

Be it known that I, JOSEPH MAXWELL CARRÈRE, a citizen of the United States, residing at Allentown, county of Lehigh, State of Pennsylvania, have invented certain new and useful Improvements in Methods of Making Portland Cement, of which the following is a full, clear, and exact description.

My invention relates to a process of making Portland cement, and has for its object to produce a more reliable process resulting in an improved product, to reduce the cost, and to provide a process of making such cement from a mix containing clay rich in alkalies.

In the manufacture of Portland cement, it has heretofore been the accepted practice to avoid what are known as alkaline clays, that is, clays rich in or containing an excess of alkalies, such as clays containing more than $2\frac{1}{2}$ or 3% of alkalies, as such excess has heretofore been liable to interfere with the burning and result in the production of a readily disintegrating cement. When a clay is rich in alkali, or alkali is added to the mix, and the raw mix is burned in an ordinary rotary kiln with the prevailing process, either coal or oil, the fluxing is liable to begin too quickly, i. e., before all of the carbonic acid gas is driven off from the limestone, and the alkali combining with the silica forms a glass which in rolling around the rotary gathers unburned material, fluxing on the surface as it rolls around and forming a ball or large clinker, which is subjected for a long period to clinkering heat and contains within it much unburned material. This action is due to the too quick fusing of the silica and alkali, as above stated, and consequent formation of an outer coating or shell which prevents the flame or heat of the rotary from acting on the unburned portions in the center of the mass, so as to produce a thoroughly burned and combined product. This mass when it does not choke the discharge end of the rotary, breaks to pieces and disintegrates, and falls to powder immediately on leaving the rotary. If the heat in the rotary is raised to such a point under these conditions as to penetrate the ball or mass thus formed, it will not only fuse the mass, but will melt it, causing it to flow and adhere to the kiln and also causing the formation of undesirable chemical combinations in the cement, which will make it unsound.

By my invention I am able to use a mix rich in alkali and to avoid the difficulties and disadvantages referred to above, producing a uniform and improved product, and also reducing the cost of burning cement.

The following is a description of my invention, reference being had to the accompanying drawings, which show a kiln for burning the cement.

Figure 1 shows a longitudinal section of the kiln. Fig. 2 is an end view of the hood. Fig. 3 is a section on the line $x$—$x$ of Fig. 1.

Referring more particularly to the drawings, A is the rotary, B is the stack, C is the charging chute, D is the hood having the discharge orifice D', E' is an oil burner having an oil supply pipe F, and a compressed air supply pipe G.

H is a fan for introducing the desired amount of air at low pressure at H².

Means for throttling all three of the passages are provided at F', G' and H'.

The rotary is mounted upon the rollers I—I and J—J, and revolved by power supplied to gears J' from any convenient source and is provided with a fire brick lining K.

L is a chute leading from the discharge opening D'.

N is the usual peep hole.

A second burner E² may also be used to increase the flame, the low pressure air nozzle being between the second burner and the material.

In carrying out my process, I feed the mix, consisting of limestone and an alkaline clay, into the rotary at the upper end, heat the rotary near the discharge end to a clinkering heat and pass the products of combustion through the rotary so as to keep the temperature in the upper part of my rotary below the sintering point of the silica in the presence of alkalies, but hot enough to drive off the moisture and carbonic acid gas before the mix reaches the sintering zone, bringing my mix by the revolutions of the rotary gradually closer to the flame O. I so regulate the temperature in the rotary that the moisture and carbonic acid gas are first driven out completely and the mass is then, and not till substantially then, subjected to the mixing heat of the flame until clinkered, and substantially immediately thereafter discharged. To accomplish this purpose, I use an intense short singeing flame, producing a clinkering of the material rolling or passing by it, and discharge the clinker as soon as formed. Any fuel can be used, but preferably fuel as free as possible of ash, phosphorus or sulfur, and I have found that I obtain the best results and can control the fusion zone to better advantage by using both compressed and low pressure air with the fuel. I preferably use crude oil, atomizing it by a small volume of compressed air or steam, and supply from an ordinary fan a large volume of air at low pressure under the axis of my kiln. This enables me to supply the necessary air to form perfect combustion with the oil uniformly and at all times, and I use, as stated above, the compressed air or steam simply to atomize the oil. The axis of the flame O is preferably substantially parallel to the axis of the cylinder, so as to singe but not impinge upon the material, and the flame is the direct product of immediate and perfect combustion on leaving the nozzle or burner.

The mixture composed of clay rich in alkali and of limestone is fed into the upper end of the rotary in the ordinary manner, the proportions being preferably 24% of alkaline clay to 76% of limestone. For white cement these materials should be substantially free from iron. As the materials pass through the rotary, the heat first drives off the carbonic acid gas and a portion of the alkali, together with any moisture which may be present. Practically all of the carbonic acid gas is driven off before the mixture reaches the fusing zone, and all the elements, lime, silica, alumina and the remaining alkalies, are heated gradually to the point of fusion, so that the chemical combination takes place simultaneously and produces a perfect clinker of Portland cement. When the material is within the fusing zone, the fusion and clinkering take place at a comparatively low degree of heat on account of the presence of the remaining alkali and the fact that the materials have been gradually heated to the point of chemical combination.

As the rotary revolves, it carries the raw mix and partly singed material with it, causing it to travel toward the discharge end, and at the same time carries it to a height on its inner circumference dependent on the speed and feed, and then drops it in a continuous stream to the lower inner circumference of the rotary, and whence is again carried up and dropped. In dropping, it forms a curve and a slide similar to the breakers of the ocean on the shore.

The flame should be directed in its course along this curve and made to singe the main body near the discharge end, as it is carried up by the rotary and dropped by it, so that once the material has reached the fusing zone it will feel its full effect continuously and uninterruptedly until it is discharged in a perfect clinker. To accomplish this, I have found it best to place the burner $E'$ to the side of the center of the rotary on which the material is carried by and slightly under the horizontal line. The exact distance must be determined by the diameter of the rotary and size of the lining. I preferably also place a second burner $E^2$ on a line with the center of the rotary and in the opposite direction about the same distance. To produce a short flame I use at each burner a small volume of compressed air or steam to atomize the oil or fuel, and low pressure air from a fan or similar apparatus to cause perfect combustion. The amount of low pressure air should be so regulated that perfect combustion takes place at once and within a short distance from the discharge end of the rotary, and the flame should not exceed 25% of the length of the kiln. The compressed air or steam should only be used to perfectly atomize the fuel and perfect combustion should be created by low pressure air. To perfectly control the singeing effect of the flame, I have the low pressure nozzle placed substantially under the center of the rotary and lower than the burner. When two burners are used, it is located between them as shown. I thereby obtain not only a perfect mingling of the air with the atomized fuel, but keep the flame singeing on at least two-thirds of the circumference of the kiln where the material to be clinkered is continuously being carried and tumbled about.

If the mixture were burned with the ordinary long flame, only a portion of the carbonic acid gas and very little of the alkali would be driven off before sintering would begin. Practically all the alkali would combine with the silica, forming a large mass of glass which would contain a large amount of unburned material.

With the ordinary process in a rotary of the usual length, sixty feet, whether burning oil or coal, the flame itself traverses practically or very nearly the entire length of the rotary, and the stack temperature is rarely under 1,000° F. or 1200° F. when the kiln is doing its duty. Under my process the clinkering flame O is a short flame extending over preferably only 15 or 20% of the length of the rotary. The intense heat is therefore to be found in this first 20% distance. The economy and saving is very great, as my stack temperatures are reduced under all circumstances and need never show over 700° F. when a mix rich in alkalies is treated, but the main advantage of my invention is that the entire process is more uniform, sure and perfect, being due to the fact that the materials are raised gradually to a fusing heat so that they are thoroughly burned and then clinkered and substantially immediately thereafter discharged so that there is no chance of its being overburned.

If an ordinary mix, i. e., a mix not rich in alkali, were treated by my process, the alkali would be so completely eliminated prior to its reaching the fusing zone that it would not be clinkered properly unless a degree of heat were used higher than that required for the alkaline clay mix since the clinkering would require even a higher degree of heat than is now used in the ordinary process. My process with a higher degree of heat is however useful with such mixes on account of the gradual heating and early driving off of substantially all the carbonic acid gas resulting in a thorough burning and the elimination of danger of overburning.

What I claim is:

1. In the manfacture of Portland cement, the improvement which consists in subjecting to a relatively low and gradually increasing heat a mix comprising limestone and clay rich in alkalies, driving off substantially all the carbonic acid gas and a portion of the alkalies, thereafter subjecting the mix to a higher and clinkering heat produced by a short intense singeing flame and discharging the resulting clinker substantially as soon as formed, the gradual heating being due to the passage of products of combustion of the short flame through the upper part of the kiln.

2. In the manufacture of Portland cement, the improvement which consists in passing a mix through a rotary, heating the rotary by burning near its discharge end in the presence of a current of air from a low pressure source fuel atomized by a small volume of fluid under high pressure and producing thereby a short intense singeing flame, passing the products of combustion through the rotary in a direction opposite to the longitudinal movement of the mix, and discharging the resulting clinker substantially as soon as formed.

3. In the manufacture of Portland cement, the improvement which consists in introducing into the kiln near its discharge end a current of air from a low pressure source, and a current of fuel atomized by a small volume of fluid under high pressure and overlying the current of air from the low pressure source, producing thereby a short intense singeing flame, passing the products of combustion through the kiln in one direction, and passing the mix through the kiln in the opposite direction and discharging the resulting clinker substantially as soon as formed.

4. In the manufacture of Portland cement, the improvement which consists in forming a mix containing approximately 76 per cent. of limestone and 24 per cent. of natural alkaline clay, the clay containing about three per cent. of alkali, the mix being substantially free from iron, subjecting said mix to a relatively low and gradually increasing heat, driving off substantially all the carbonic acid gas and a portion of the alkalies, thereafter subjecting the mix to a short intense singeing flame and discharging the resulting clinker substantially as soon as formed, the gradual heating being due to the products of combustion of the short singeing flame.

J. MAXWELL CARRÈRE.

Witnesses:
H. B. BROWNING,
M. E. GARRETT.